J. REID.
Mariner's Compass Scale.
No. 57,970.
Patented Sept. 11, 1866.
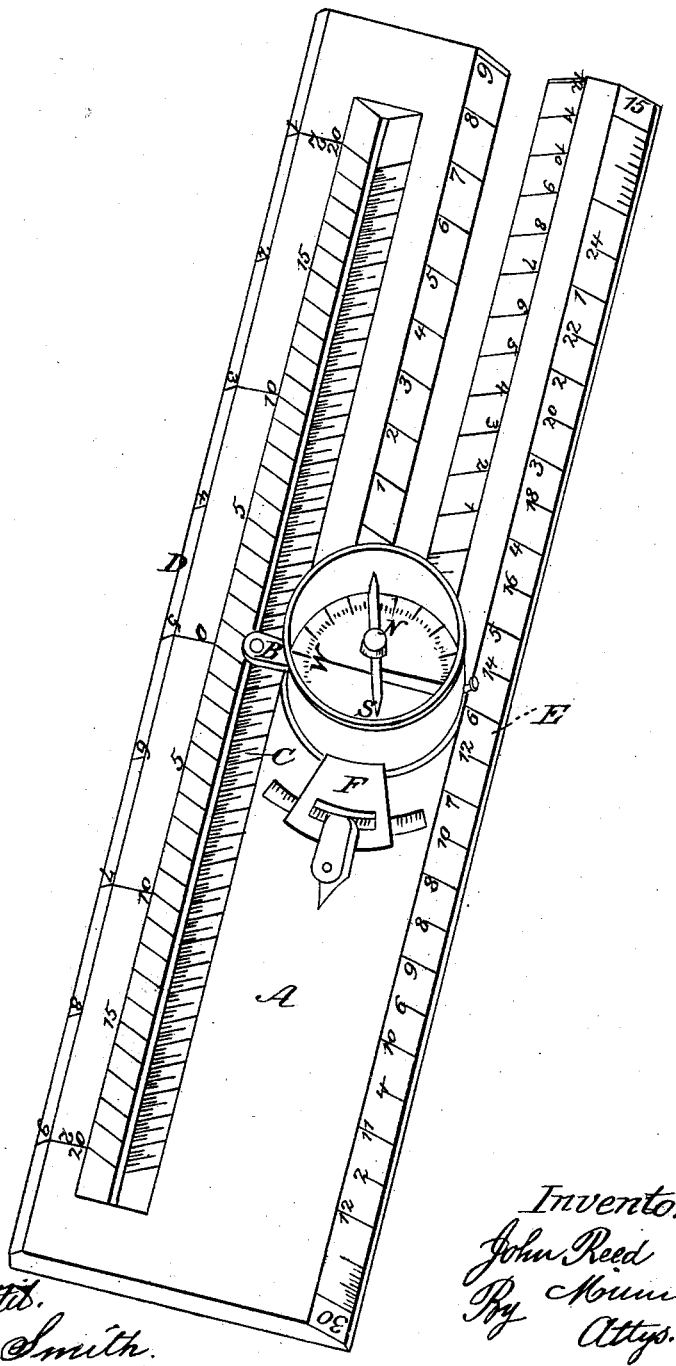
Witnesses
Charles A. Pettit.
Chas. D. Smith.
Inventor.
John Reed
By Munn & Co
Attys.

UNITED STATES PATENT OFFICE.

JOHN REID, OF KNOXVILLE, MARYLAND.

IMPROVEMENT IN MARINERS'-COMPASS SCALES.

Specification forming part of Letters Patent No. 57,970, dated September 11, 1866.

*To all whom it may concern:*

Be it known that I, JOHN REID, of Knoxville, in the county of Frederick and State of Maryland, have made a new and useful Improved Compass-Scale; and I do hereby declare the following to be a full, clear, and exact description of the nature, construction, and operation of the same sufficient to enable one skilled in the art to which it is allied to construct and use the same, reference being had to the accompanying drawing, which is made part of this specification, and in which my improvement is represented by a plan view.

My improvement consists of an instrument for drawing parallel lines or lines at any angle, or figures of any required angularity.

A scale is furnished with a compass, which will indicate by the needle the position of the ruling-edge of the scale. The compass is capable of rotation in a horizontal plane, and has an index and vernier to permit its adjustment to correspond to the variation. The scale is also provided with a center-pin in the line of one its edges.

In the drawing, A is the body of the scale, which may have any required number of edges, marked with any required graduations, such as decimal or duodecimal divisions or scales of chains.

In the drawing, the westerly edge, D, is simply inches. Next to it, in the opening, is a unit of two inches divided into tenths on one side, and those tenths again divided into hundredths on the other side. This is probably the most valuable and useful scale in a working instrument; and here I set the center-pin B to represent zero, at the initial-point of a line to be measured or projected.

In the bifurcation C of the instrument are scales of twenty-five and thirty to the inch, and on the eastern edge, E, are scales of fifteen and thirty to the inch.

To this scale is attached a small compass, which may be placed on top at the side or at one end.

The degrees on the compass will be marked as the ordinary surveyor's compass from north and south, from one degree to ninety degrees east and west.

The compass has a vernier, F, to set it for variation; also a center-pin, B, as before remarked, to fix it in the starting-point of a line.

The instrument can be used for drawing parallel lines of equal or unequal distances, drawing right angles or any other angles, or ascertaining the angles of any figure.

The method of operating is this: For plotting, fix upon the beginning, place the center-pin (in principal scale) over that point, press sufficiently on the spring to fix the point of the pin in the paper or other material; then, if the course be north-east or north-west, move the north end of the instrument till the needle points to the proper degree or course, observe the distance required on the scale, mark it with any sharp-pointed instrument, and draw your line. Then fix center-pin in the end of said line, and proceed as before. If the course is south-east or south-west, the south end of the instrument must be used instead of the north end. For the other scales, the distance must first be ascertained; then one end placed over the point of beginning, the instrument adjusted to the proper course, the other end marked, line drawn, &c.

The vernier is to be used thus when part of a plot is to be made by present survey and part by a former survey, when there is a variation. For present survey, proceed as above till you come to former survey; then, say the variation is two degrees east or north; loose the tightening-screw, move the vernier east or west two degrees, as required; tighten the screw, and proceed with plot without adding or subtracting the two degrees in each course. To draw parallel lines, place the instrument where you want one line to be, and if a given distance is wanted, mark it from the scale, observe the degree the needle points to; then place the instrument where the other line is to be drawn, and let needle point to same degree. The lines must be parallel. To draw a right angle, lay the instrument in the proper place; draw a line; then turn till the needle shows a difference of ninety degrees, and you have a right angle. So with any other angle. To ascertain an angle, place the instrument on one line and note the degree; then place it on the other line, and the difference will be the angle.

I do not claim any particular scale or scales, nor do I wish to confine my invention to any one, for it is equally applicable to any scale; neither do I claim any improvement in the compass separately considered; but

What I claim as new, and desire to secure by Letters Patent, is—

1. The combination of the compass and the scale, substantially as described.

2. In combination with the above, the arrangement for setting compass to a given variation, for the purpose described.

3. In its combination with the compass and scale, the center-pin, operating substantially as described.

JOHN REID.

Witnesses:
 JOSEPH GOODMAN,
 J. M. MILLER.